United States Patent Office 2,783,225
Patented Feb. 26, 1957

2,783,225

AZO-DYESTUFFS INSOLUBLE IN WATER

Gerhard Langbein, Hofheim, Taunus, Germany, assignor to Farbwerke Hoechst Aktiengesellschaft vormals Meister Lucius & Brüning, Frankfurt am Main, Germany, a company of Germany No Drawing. Application October 27, 1953,
Serial No. 388,683

Claims priority, application Germany November 3, 1952

7 Claims. (Cl. 260—176)

The present invention relates to new azo-dyestuffs insoluble in water and to fiber dyed therewith; more particularly it relates to azo-dyestuffs corresponding to the following general formula

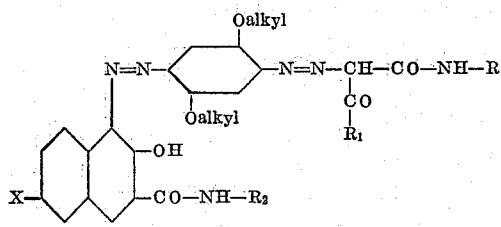

wherein R represents an aromatic, hydroaromatic, araliphatic or heterocyclic radical and $R_1$ represents an alkyl or aryl group, $R_2$ represents an aryl radical and X represents hydrogen, an alkoxy group or a halogen atom.

I have found that new valuable water-insoluble azo-dyestuffs can be obtained by coupling in substance, on the fiber or on a substratum suitable for the production of lakes a diazo-compound of an aminoazo-compound of the following general formula

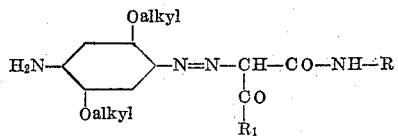

wherein R and $R_1$ have the meanings given above, with an arylide of 2.3-hydroxynaphthoic acid, the dyestuff components being free from groups imparting solubility in water, such as sulfonic acid or carboxylic acid groups.

A large number of the new diazo-components yield blue-green to green tints which could hitherto be obtained in practice only with the use of arylides of 2.3-hydroxyanthracene-carboxylic acid. In many cases the dyestuffs of the invention possess a better fastness to light and chlorine than the known green dyestuffs which are obtained by using 2.3-hydroxyanthracene-carboxylic acid arylides as coupling components. Moreover, considerable advantages are involved in the production of the blue-green tints. The new dyestuffs are well suitable for the production of prints by the known methods of base printing. In addition to blue-green tints, it is also possible to produce clear orange, red, blue or other tints on the same grounding component with commercial bases, which is an advantage especially in the printing, but also in the dyeing industry. Furthermore, the new azo-dyestuffs can be produced far more economically than the dyestuffs obtained on the basis of 2.3-hydroxyanthracene-carboxylic acid arylides. These known blue-green dyestuffs could not be introduced into practice for base printing processes, since owing to the natural color and high substantivity of the grounding component, no pure white can be produced on the unprinted parts; moreover, apart from blue-green shades, no other tints valuable for the industry can be produced on these grounding components.

The dyestuffs of this invention, therefore, constitute a valuable enrichment of the class of ice-colors.

The aminoazo-compounds used as diazo-components can be obtained, for example, by coupling a diazotized 1-amino-2.5-dialkoxy-4-nitrobenzene with an acylacetic acid arylide of the following formula

in which R represents an aromatic, hydroaromatic, araliphatic or heterocyclic radical and $R_1$ represents an alkyl or aryl group, and subsequently reducing the nitro group to the amino group.

The following examples serve to illustrate the invention but they are not intended to limit it thereto, the parts being by weight, unless otherwise stated:

Example 1

35.6 parts of α-(4'-amino-2'.5'-dimethoxybenzene-1'-azo)-acetoacetic acid anilide of the following formula

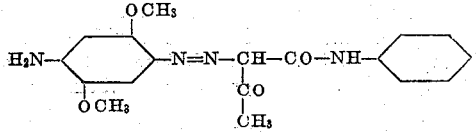

(obtainable by coupling diazotized 1-amino-2.5-dimethoxy-4-nitrobenzene with acetoacetic acid anilide and subsequently reducing the nitro group to the amino group) are kneaded for about 15 minutes with 35 parts of hydrochloric acid of 35 percent strength and 35 parts of water, the hydrochloride being formed. 1600 parts of water are then run in, while stirring, and the mixture is diazotized at room temperature by adding dropwise, in the course of about 10 minutes, 17.5 parts of a sodium nitrite solution of 40 percent strength. After heating to 30° C.–35° C., the diazo-solution is clarified by filtering off with suction. The filtrate is run, while stirring, into a suspension of 1-(2'.3'-hydroxynaphthoylamino)-benzene, which was prepared as follows:

26.3 parts of 1-(2'.3'-hydroxynaphthoylamino)-benzene, 26 parts of alcohol of 95 percent strength, 13 parts of a sodium hydroxide solution of 38° Bé. and 40 parts of water are stirred until dissolution is complete. The solution is then poured into a mixture of 500 parts of water, 10 parts of Turkey red oil and 5 parts of a sodium hydroxide solution of 38° Bé., and the anilide is precipitated again, while stirring, by adding dropwise an acetic acid of 30 percent strength, until a neutral reaction is attained.

In the coupling mixture the excess of mineral acid is then neutralized by adding dropwise 250 parts of a sodium acetate solution of 10 percent strength. The whole is heated to 35° C.–40° C. and stirred for a prolonged time at this temperature. The precipitate is then filtered off with suction and washed well with water.

A blue-green pigment dyestuff of good fastness to light is obtained. It corresponds to the following formula

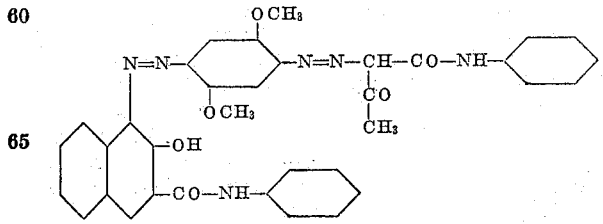

Example 2

Well boiled and dried cotton yarn is treated for about half an hour at a ratio of goods to liquor of 1:20 in a solution containing per liter 3 grams of 1-(2'.3'-hydroxynaphthoylamino)-benzene, 3 grams of a formaldehyde solution of 33 percent strength, 12 cc. of a sodium hydroxide solution of 38° Bé. and 10 cc. of Turkey red oil. After squeezing, the impregnated material is introduced into a developing bath which has been prepared as follows:

1.5 parts of the hydrochloride of α-(4'-amino-2'.5'-diethyoxybenzene-1'-azo) - acetoacetic acid anilide are added, while stirring, to a mixture of 150 parts of water and 1.5 parts of hydrochloric acid of 20 pereccent strength. The mixture is diazotized, by adding dropwise 1.2 parts of a sodium nitrite solution of 20 percent strength. The excess of mineral acid is neutralized by the addition of 5 parts of a sodium acetate solution of 10 percent strength, 5 parts of an acetic acid of 30 percent strength are then added and the solution of the diazonium salt is made up to 1000 parts.

The dyeing is developed for 15–20 minutes, rinsed with hot water and after-treated at the boil for half an hour with a solution containing per liter of liquor 3 grams of soap and 2 grams of anhydrous sodium carbonate. A clear blue-green dyeing of good fastness to light, good properties of wet fastness and medium fastness to chlorine is obtained.

When the same diazo-compound is coupled on cotton yarn in the manner described above with 1-(2'.3' - hydroxynaphthoylamino) - 2 - methylbenzene, a somewhat greener dyeing of similar properties is obtained.

*Example 3*

Staple fiber yarn of regenerated cellulose is treated for about 20–30 minutes at a ratio of goods to liquor of 1:20 in a solution containing per liter 1.5 grams of 1-(6'-methoxy - 2'.3' - hydroxynaphthoylamino) - 2 - methyl-4-chlorobenzene, 11 cc. of a sodium hydroxide solution of 38° Bé., 1.5 cc. of a formaldehyde solution of 33 percent strength and 10 cc. of Turkey red oil. After squeezing, the impregnated yarn is introduced into a developing bath containing per liter 5 grams of a dyeing salt which consists of the diazonium chloride of α-(4'-amino-2'.5'-dimethoxybenzene - 1'-azo)-acetoacetic acid-3-ethoxyanilide with a content of the base of 25 percent and 2 grams of acetic acid of 50 percent strength. The dyeing is developed for 20–30 minutes, rinsed and after-treated at the boil for half an hour with a solution containing per liter of liquor 3 grams of soap and 2 grams of anhydrous sodium carbonate. A clear green dyeing of very good fastness to light and good properties of wet fastness is obtained.

In the same manner the dyestuff can be produced on viscose rayon yarn, a somewhat more intense dyeing being obtained.

*Example 4*

Cotton fabric is padded on the foulard with a solution containing per liter 8 grams of 1-(2'.3'-hydroxynaphthoylamino)-2-methylbenzene, 15 grams of a sodium hydroxide solution of 38° Bé. and 15 grams of Monopol Brilliant Oil, dried and printed with a paste containing in 1000 grams 50 grams of a dyeing salt consisting of the diazonium salt of α-(4'-amino-2'.5'-dimethoxybenzene-1'-azo)-acetoacetic acid anilide with a content of the base of 22 percent, 480 grams of water, 450 grams of starch-thragacanth thickening and 20 grams of acetic acid of 50 percent strength. After drying, the material is passed through a boiling bath containing per liter 10 grams of anhydrous sodium carbonate, rinsed and after-treated at the boil for some minutes with a solution containing 3 grams of soap and 2 grams of sodium carbonate per liter of liquor. An intense blue-green print of good fastness to light and good properties of wet fastness is obtained.

The above printing process can also be applied to other kinds of fabric, for example staple rayon or viscose rayon crêpe.

When other diazotized aminoazo-compounds of the above constitution and other 2.3-hydroxynaphthoic acid arylides are used according to the usual dyeing or printing processes, dyestuffs of similar good fastness properties are obtained.

The following table indicates the tints obtained by subjecting the material to an after-treatment with a boiling solution of soap and sodium carbonate:

| Diazo component | Coupling component | Tint |
|---|---|---|
| α-(4'-amino-2'.5'-dimethoxybenzene-1'-azo)-acetoacetic acid | 1-(2'.3'-hydroxynaphthoylamino) | |
| (1) -anilide | -benzene | blue-green. |
| (2) -anilide | -2-methyl-4-chlorobenzene | Do. |
| (3) -anilide | -2-methyl-4-methoxybenzene | greenish-blue. |
| (4) -anilide | -2.4-dimethoxy-5-chlorobenzene | blue-green. |
| (5) -anilide | -naphthalene | Do. |
| (6) -2-methyl-anilide | -2-methylbenzene | Do. |
| (7) -3-methyl-anilide | -benzene | Do. |
| (8) -3-methyl-anilide | -2-methylbenzene | Do. |
| (9) -3-methyl-anilide | -2-methyl-4-chlorobenzene | Do. |
| (10) -4-methyl-anilide | -benzene | Do. |
| (11) -4-methyl-anilide | -2-methylbenzene | Do. |
| (12) -4-methyl-anilide | -2-methyl-4-chlorobenzene | greenish-blue. |
| (13) -3-chloro-anilide | -benzene | green-blue. |
| (14) -3-chloro-anilide | -2-methylbenzene | blue-green. |
| (15) -3-chloro-anilide | -2-methyl-4-chlorobenzene | greenish-blue. |
| (16) -4-chloro-anilide | -benzene | blue-green. |
| (17) -4-chloro-anilide | -2-methylbenzene | Do. |
| (18) -4-chloro-anilide | -2-methoxybenzene | Do. |
| (19) -3-ethoxy-anilide | -benzene | Do. |
| (20) -3-ethoxy-anilide | -2-methylbenzene | Do. |
| (21) -3-ethoxy-anilide | -2-methyl-4-chlorobenzene | green. |
| (22) -3-ethoxy-anilide | -2-methoxybenzene | blue-green. |
| (23) -4-ethoxy-anilide | -benzene | green. |
| (24) -4-ethoxy-anilide | -2-methylbenzene | Do. |
| (25) -2.3-dimethyl-anilide | -benzene | blue-green. |
| (26) -2.3-dimethyl-anilide | -2-methylbenzene | green. |
| (27) -2.3-dimethyl-anilide | -2-methyl-4-chlorobenzene | greenish-blue. |
| (28) -2.4-dimethyl-anilide | -benzene | blue-green. |
| (29) -2.4-dimethyl-anilide | -2-methylbenzene | Do. |
| (30) -2.5-dimethyl-anilide | -benzene | dull blue-green. |
| (31) -2.5-dimethyl-anilide | -2-methylbenzene | green. |
| (32) -2-methyl-4-chloro-anilide | -benzene | greenish-blue. |
| (33) -2-ethylsulfonyl-5-trifluoromethyl-anilide | do | blue. |
| (34) -2-ethylsulfonyl-5-trifluoromethyl-anilide | -2-methylbenzene | Do. |
| (35) -2.5-dichloro-anilide | do | Do. |
| (36) -diphenylsulfone-2-amide | -2-methyl-4-chlorobenzene | blue-green. |
| (37) -cyclohexyl-1-amide | -benzene | grey-blue. |
| (38) -naphthyl-1-amide | -2-methylbenzene | grey-green. |
| (39) -naphthyl-2-amide | -benzene | blue-green. |
| (40) -naphthyl-2-amide | -2-methylbenzene | green. |
| (41) -naphthyl-2-amide | -2-methyl-4-chlorobenzene | blue-green. |
| (42) -anthraquinonyl-2-amide | -benzene | grey-green. |
| (43) -6-methoxybenzthiazole-2-amide | do | grey-blue. |
| (44) -6-methoxybenzthiazole-2-amide | -2-methyl-4-chlorobenzene | dark blue. |
| (45) -N-ethyl-carbazolyl-3-amide | -benzene | blue-green. |
| (46) -N-ethyl-carbazolyl-3-amide | -2-methylbenzene | Do. |
| α-(4'-amino-2',5'-diethoxybenzene-1'-azo)-acetoacetic acid | | |
| (47) -anilide | -2-methoxybenzene | Do. |
| (48) -anilide | -naphthalene | green. |
| (49) -anilide | 2-(2'.3'-hydroxy-naphthoylamino)-naphthalene | dark green. |
| | 1-(2',3'-hydroxynaphthoylamino) | |
| (50) -3-methyl-anilide | -benzene | blue-green. |
| (51) -3-methyl-anilide | -2-methylbenzene | Do. |
| (52) -3-methyl-anilide | -2-methyl-4-chloro-benzene | Do. |
| (53) -3-methyl-anilide | -naphthalene | green. |
| (54) -benzylamide | -benzene | blue. |
| (55) -benzylamide | -naphthalene | greenish-blue. |
| (56) -2-chloro-anilide | -2-methylbenzene | blue-green. |
| (57) -4-chloro-anilide | -benzene | blue-green. |

| Diazo component | Coupling component | Tint |
| --- | --- | --- |
| (58) -4-chloro-anilide | -2-methylbenzene | blue-green. |
| α-(4'-amino-2'.5'-dimethoxybenzene-1'-azo)-benzoylacetic acid | | |
| (59) -anilide | -benzene | greenish-blue. |
| (60) -anilide | -2-methylbenzene | Do. |
| (61) -anilide | -2-methyl-4-chloro-benzene. | blue. |
| α-(4'-amino-2'.5'-dimethoxybenzene-1'-azo)-acetoacetic acid | 1-(6'-bromo-2'.3'-hydroxynaphthoylamino) | |
| (62) -anilide | -benzene | blue-green. |

I claim:
1. The water-insoluble azo-dyestuffs corresponding to the following general formula

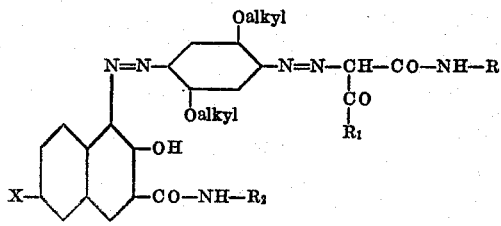

wherein R represents a member of the group consisting of radicals of the benzene and naphthalene series, an anthraquinonyl, a cyclohexyl, benzyl, benzthiazole and carbazole radical, R₁ represents a member of the group consisting of methyl and phenyl, R₂ represents a member of the group consisting of radicals of the benzene and naphthalene series, and X stands for a member of the group consisting of hydrogen, methoxy and bromine.

2. The water-insoluble azo-dyestuffs corresponding to the following general formula

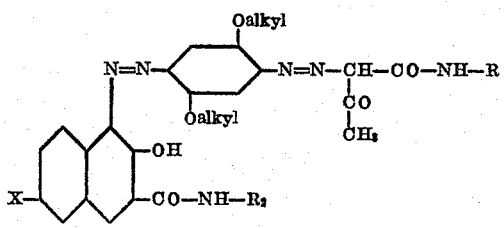

wherein R represents a radical of the benzene series, R₂ represents a member of the group consisting of radicals of the benzene and naphthalene series, and X stands for a member of the group consisting of hydrogen, methoxy and bromine.

3. The water-insoluble azo-dyestuff corresponding to the following formula

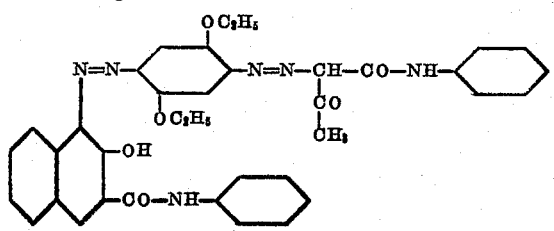

4. The water-insoluble azo-dyestuff corresponding to the following formula

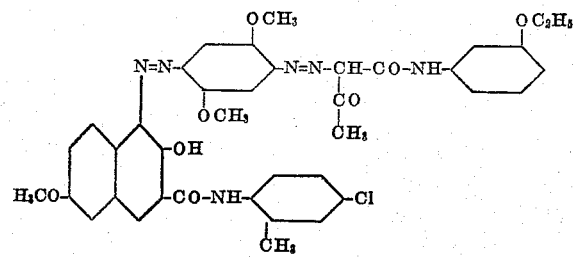

5. The water-insoluble azo-dyestuff corresponding to the following formula

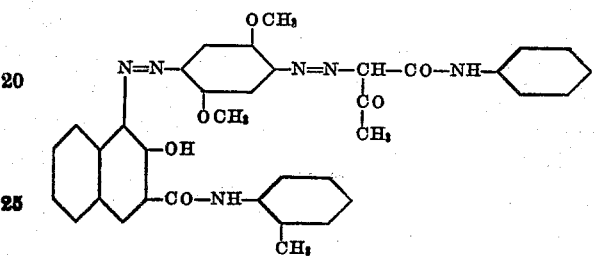

6. The water-insoluble azo-dyestuff corresponding to the following formula

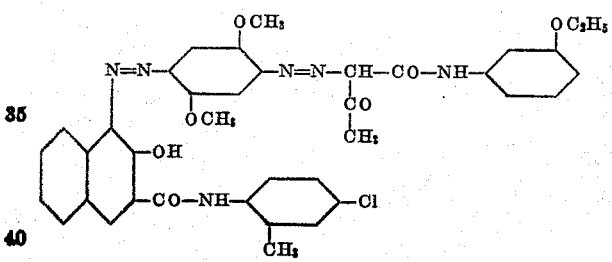

7. The water-insoluble azo-dyestuff corresponding to the following formula

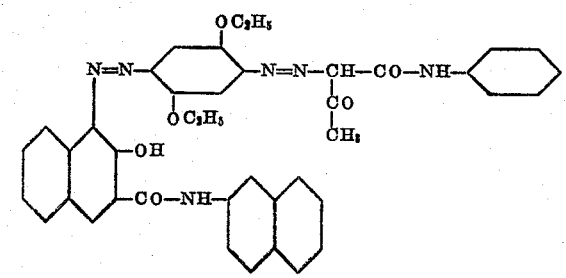

References Cited in the file of this patent

UNITED STATES PATENTS

| 2,069,158 | Schnitzspahn et al. | Jan. 26, 1937 |
| 2,112,764 | Dahlen et al. | Mar. 29, 1938 |
| 2,175,370 | Zwilgmeyer | Oct. 10, 1939 |